United States Patent [19]

Kim

[11] 4,209,275
[45] Jun. 24, 1980

[54] TWIST DRILL

[76] Inventor: Joo B. Kim, 1704 - 18th Ave., Pasco, Wash. 99301

[21] Appl. No.: 955,650

[22] Filed: Oct. 30, 1978

[51] Int. Cl.² .............................................. B23B 51/02
[52] U.S. Cl. .................................... 408/211; 408/230
[58] Field of Search ....................... 408/230, 211, 212

[56] References Cited

U.S. PATENT DOCUMENTS

| | | | |
|---|---|---|---|
| 112,115 | 2/1871 | Boyden | 408/230 |
| 167,766 | 9/1871 | Hunt | 72/364 |
| 189,265 | 4/1877 | Richardson | 72/371 |
| 262,588 | 8/1882 | Hartshorn | 408/230 |
| 2,600,286 | 6/1952 | Weiland | 408/211 |
| 3,045,513 | 7/1962 | Andreasson | 408/59 |
| 3,564,947 | 2/1971 | Maier | 408/211 |

*Primary Examiner*—Z. R. Bilinsky

*Attorney, Agent, or Firm*—Wells, St. John & Roberts

[57] ABSTRACT

A twist drill for producing or enlarging holes in a metal workpiece includes a point with peripheral cutting shoulders and concave cutting lips leading inwardly from the shoulders to a central chisel point. The cutting shoulders are spaced slightly toward the shank end of the drill from the chisel point along the axis of the drill. The cutting lips are longitudinally convex so that points along the bases thereof will be spaced axially toward the drill shank from the cutting shoulders. The concave configuration along with the smooth curvature of the cutting lips facilitates quick removal of metal while causing minimal wear along the actual cutting surfaces. Chips are directed inwardly from the cutting shoulders and outwardly from the chisel point. The oppositely flowing chips converge within the drill flutes and are carried outward of the hole along the drill axis.

1 Claim, 6 Drawing Figures

U.S. Patent    Jun. 24, 1980    4,209,275
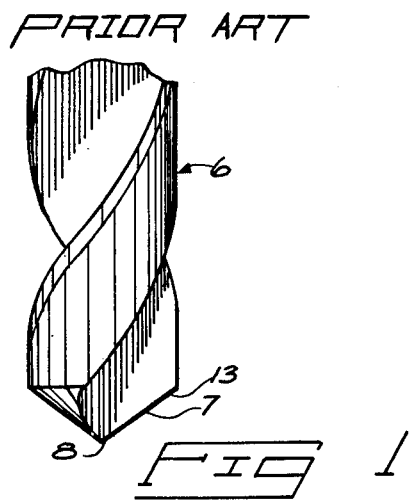
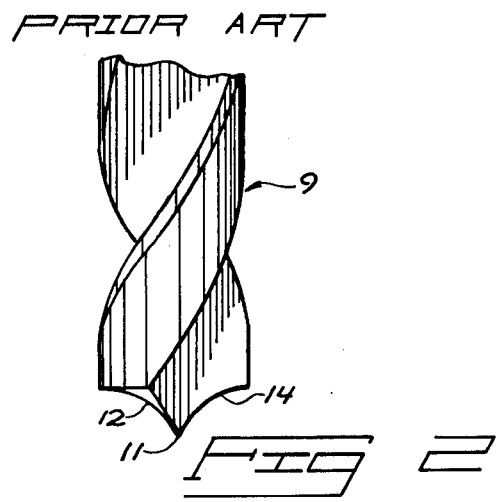
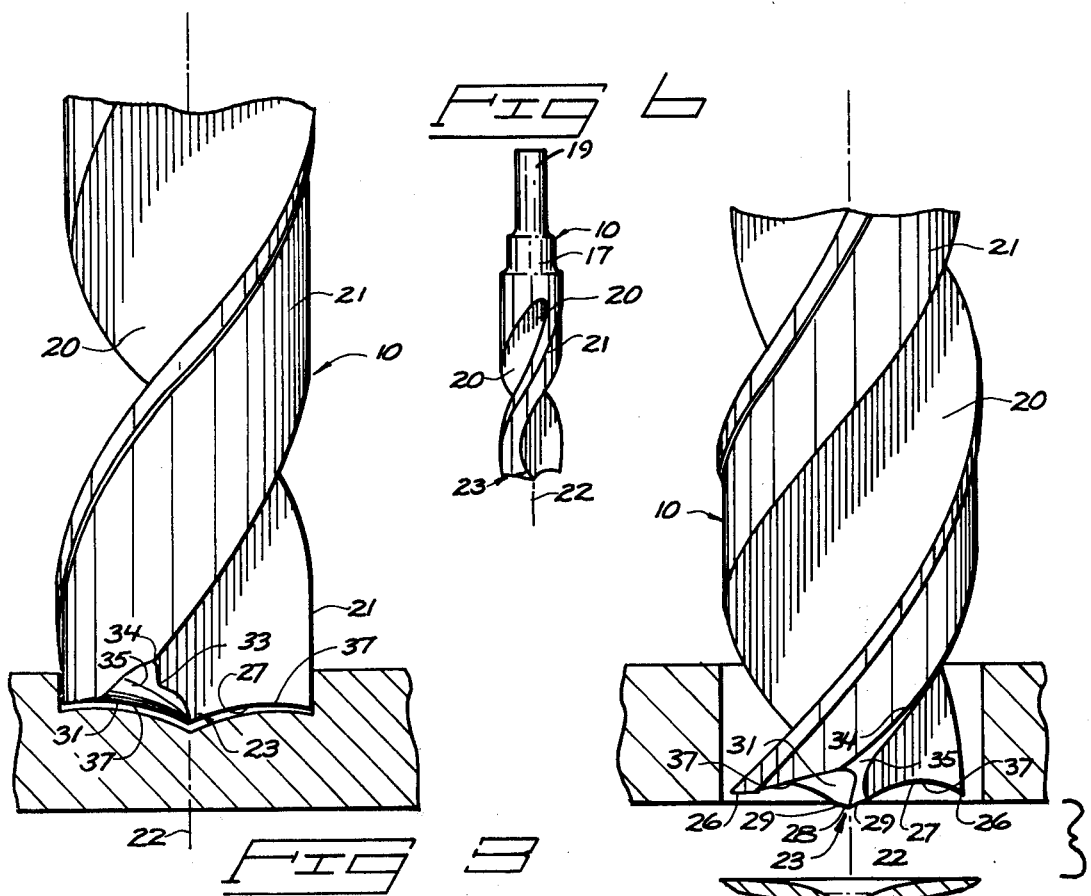
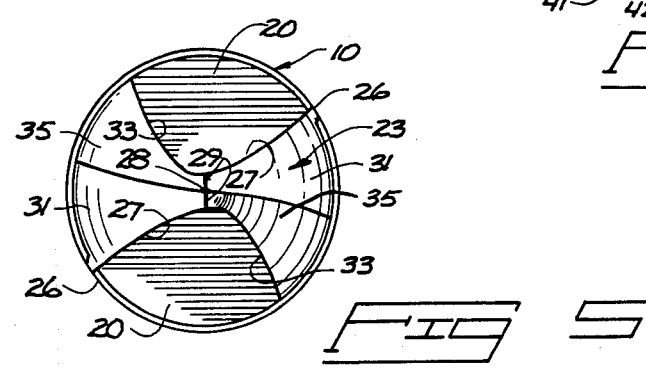

TWIST DRILL

BACKGROUND OF THE INVENTION

The present invention relates to twist drills and more specifically to such twist drills for use in producing and enlarging holes in metal workpieces.

A conventional twist drill includes a pointed end that is essentially conical with surfaces leading to a chisel point at its center. The operation of a twist drill typically involves a combination of two metal removing processes. The metal to be removed directly beneath the chisel point cannot be removed totally by a cutting action in that the precise center of the drill is subjected only to axial motion. The result is that the material is deformed rather than cut, in a manner similar to deformation caused by a metal punch. As the distance increases from the exact center of the drill, so does the rotational motion of the cutting lips. The lips may then effectively operate as cutting surfaces. However, the conical surfaces of the point causes outward flow of chips toward the shoulders of the drill. This causes a binding effect and reduces efficiency of the drill as a cutting tool. The cutting lips may produce a conventional chip formation and would operate rather effectively were it not for the poor cutting capacity of the chisel point.

It therefore becomes desirable to obtain a twist drill with a point design that will maximize efficiency of the cutting lips while eliminating outward chip flow initiated at the chisel point.

BRIEF DESCRIPTION OF THE DRAWINGS

FIG. 1 is an elevational view of a prior art form of drill bit;

FIG. 2 is a view of another prior form of drill bit;

FIG. 3 is an elevational view of the present drill;

FIG. 4 is a view as seen from the right in FIG. 3;

FIG. 5 is an end view of the present drill; and

FIG. 6 is a reduced overall elevation view of the present drill.

DETAILED DESCRIPTION OF A PREFERRED EMBODIMENT

The present drill structure is illustrated in the accompanying drawings in FIGS. 3 through 6 and is indicated therein at 10. Prior art drill structures are illustrated in FIGS. 1 and 2. The present conventional form of twist drill is shown in FIG. 1 at 6. The conventional twist drill 6 includes conical heel surfaces 17 forming a chisel point 8. The FIG. 2 prior art form of drill, as illustrated at 9, includes a chisel point 11 formed by convex heel surfaces 12. Examples of this second form of twist drill configuration are shown by the following U.S. Patents: Richardson, U.S. Pat. No. 189,265 (1877); Boyden, U.S. Pat. No. 112,115 (1871); Hartshorn, U.S. Pat. No. 262,588 (1882); and Andreasson, U.S. Pat. No. 3,045,513 (1962).

It is important to note the heel surfaces 7, 12 of the respective prior art drills. They lead from chisel points 8, 11 to outer shoulders along substantially straight cutting lips 13, 14. The lips 13, 14 terminate at the drill periphery at cutting shoulders 16a. These shoulders are spaced axially from the chisel points toward the shank ends of the drills.

The cutting action is basically identical in both forms of the drill forms illustrated in FIGS. 1 and 2. The drills are rotated about their longitudinal axes and thrust axially against a workpiece. The chisel points 18, 11, being so close to the drill axis, perform very little of the cutting action. They merely provide a point at which the cutting action may be initiated by driving into the workpiece and forcing material outwardly. This action is similar to that of a punch or nail being driven against a workpiece surface. The workpiece material is merely wedged to opposite sides of the points 8, 11. This displaced material is caught by the cutting lip edges and is removed through the helical longitudinal flutes. The outward impetus of the material removed by the drill point can have some effect on the material being cut by the drill lips 16, 16a, causing the chips to flow against the sides of the bore and lands 16c and 16e of the drill. Cutting efficiency is therefore reduced due to the binding effect at the drill points 12, 14.

The present drill 10 is formed of an elongated round bar 17 (FIG. 6). A cylindrical shank 18 is provided at a shank end 19. Helical flutes 20 and lands 21 extend longitudinally from the shank 18 to a point 23. The flutes 20 and lands 21 are generated about the longitudinal axis of the drill which is indicated at 22. The flutes 20 and lands 21 are of conventional design, as is the shank 18.

The point 23 embodies the novel principals of the present invention.

Point 23 is shown including peripheral cutting shoulders 26. The shoulders 26 are formed in the lands 21 at the edge surfaces of the flutes 20. Shoulders 26 also represent outer ends of substantially radial cutting lips 27. The lips 27 lead inwardly from the cutting shoulders 26 to a chisel point 28.

The chisel point 28 is somewhat different than the points illustrated in FIGS. 1 and 2 in that it includes converging chisel point edges 29. The chisel point will therefore come to a true point rather than a straight or arcuate edge surface as provided in the FIG. 1 and 2 drill structures. The point edges 29 are formed along straight lines (FIGS. 4 and 5) diverging from the central axis and joining the cutting lips 27 at points equally spaced from the central axis.

The drill material between the flutes 20, termed the "web" forms the heel surfaces 31 of point 23. The heel surfaces 31 are inclined in the preferred direction of rotation and lead from the cutting lips 27 to trailing edges 33. The trailing edges 33 lead inwardly from rearward peripheral shoulders 34 (FIG. 3) at the drill periphery inwardly to the chisel point 28. The shoulders 34 are spaced axially toward the shank from the chisel point 28. They are also spaced axially toward the shank from the cutting shoulders 26. This relationship provides for a lip relief angle that is typical to twist drill construction. However, the angle is not consistent along the heel surface. Instead, the heel surfaces are divided to include chisel edge forming surfaces 35. These surfaces cooperate with the heel surfaces 31 to form the chisel point with converging chisel point edges 29.

The specific configuration of the cutting lips 27 is a very important feature of the present invention. The cutting lips 27 are longitudinally concave in relation to the axis 22. Lips 27 are formed along smoothly curved lines with base points 37 thereof spaced axially toward the shank from the cutting shoulders 26 and from the chisel point 28. With this arrangement, the order of surface material engagement when the drill is moved axially in operation is (1) chisel point 28; (2) cutting shoulders 26; and (3) base points 37. The chisel point will first engage the material followed closely by the cutting shoulders at the drill periphery. Finally, the base points 37 along the cutting lips will engage the workpiece material, radially between the chisel point 28 and cutting shoulders 26.

The cutting lips 27 are formed along smooth curved unbroken lines leading directly from the drill periphery (at cutting shoulders 26) to the chisel point 28. The curvature is somewhat compound. It is concave longitudinally as discussed above and, with reference to FIG. 5, is also concave in the direction of drill rotation. The cutting shoulders 26 will therefore slightly lead the base points 37 during operation of the drill. The combined curvatures of the smooth, unbroken cutting lips 27 give the cutting shoulders a plow configuration whereby material engaged by the shoulders is cut and urged radially inward toward the drill axis 22.

From the above detailed description, the operation of the present drill may now be easily understood.

Prior to operation, the drill is fitted to an appropriate drilling machine with the chuck or tool holder of the machine securely clamping the shank 18. The workpiece is situated along the longitudinal axis of the drill 10 for movement along the axis relative to the drill. The drill can then be rotated about the axis 22 and moved axially toward the workpiece, or the workpiece may be moved axially toward the rotating drill.

The chisel point 28 is first to come into contact with the workpiece surface. Except for the extreme tip of the chisel point 28, the entire chisel point area operates to cut and move material both radially outward toward the lands and axially toward the shank. Material engaged at the exact center of the drill along the axis 22 is forced outwardly due to the axial force maintained between the drill and the workpiece. This displaced material is carried along with the material cut by the remaining portions of the point.

Further axial motion of the drill with respect to the workpiece brings the cutting shoulders 26 into contact with the workpiece shortly after initial contact by the chisel point. The cutting shoulders each perform a cutting and material chip directing function. The material cut by the shoulders 26 is directed both toward the shank end 19 and radially inward toward the drill axis. The amount of material engaged by the cutting lips 27 increases as the drill cuts deeper into the workpiece.

Finally, all cutting surfaces of the drill are put into operation and the cutting forces are distributed along the cutting lips 27 from the cutting shoulders 26 to the chisel point 28. The radial outward migration of cut material produced at chisel point 28 is met by the radial inward migration of material cut at the shoulders 26. The result is a broken chip that is carried easily outward of the bore being formed by the drill through the flutes 20. There is no binding of cut material within the bore between the walls of the bore and the lands of the drill.

Tangible evidence of the cutting action is experienced at the end of the bore where the drill forms a slug 41 (FIG. 4). The slug 41 is of discoidal shape and includes a diameter substantially equal to that of the working diameter of the drill 10. The slug 41 includes a central indentation 42 formed by the chisel point 28 and toroidal convex surfaces 43 formed by the smooth, arcuate cutting lips 27. The slug is produced due to the axial relationship of the cutting shoulders 26 and chisel point 28. The chisel point 28, because it is necessarily closely adjacent to the turning axis for the drill, cannot perform entirely efficiently. It will therefore distort the workpiece that is in axial alignment therewith. The chisel point is followed axially by the cutting shoulders 26 which remove material at the periphery of the slug and which pass through the workpiece ahead of the remainder of the cutting lips 27.

Formation of the slug 41 is of itself a time saving feature. Removal of the slug occurs as the shoulders 26 reduce the thickness of the workpiece to a point where the axial force between the workpiece and drill overcomes the resistance of the workpiece material and the slug falls away. The material remaining in the slug therefore is removed without need of further cutting operations from the remaining portions of the cutting lips. This saves both drilling time and drill wear.

The above description and drawings are given by way of example to set forth a preferred form of the present invention. Only the following claims, however, are to be taken as definitions of my invention.

What I claim is:

1. A twist drill, comprising:
   an elongated round bar formed about a longitudinal central axis;
   helical flutes formed within said bar and generated about said central axis;
   lands formed between said flutes;
   a point at one end of said bar;
   a shank end at a remaining end of said bar;
   wherein said point includes:
   cutting shoulders formed along said lands on the periphery of said bar;
   cutting lips formed along continuous smooth curved lines leading transversely toward said central axis directly from said cutting shoulders;
   a central chisel point at the inward ends of said cutting lips and centered on said central axis;
   wherein said cutting shoulders are spaced axially toward said shank end from said chisel point;
   wherein said cutting lips are longitudinally concave with bases thereof spaced axially toward said shank end from said cutting shoulders;
   heel surfaces formed at said point, leading from said cutting lips about said axis to trailing edges defined by said flutes;
   rearward shoulders along said trailing edges that are axially spaced toward said shank end from the bases of said cutting lips, inwardly to said chisel point; and
   chisel edge forming surfaces adjacent to said heel surfaces and angularly offset toward the shank end therefrom, leading inwardly from the lands to said chisel point, thereby forming two straight chisel edges at said chisel point diverging from the central axis and joining the concave cutting lips at points equally spaced from the central axis.

* * * * *